United States Patent [19]

Pemberton et al.

[11] 4,081,232
[45] Mar. 28, 1978

[54] FIXED CENTER TOOLING FOR AN EXTRUDER THAT PROVIDES FOR CONCENTRIC LAYERS OF COATING MATERIAL

[75] Inventors: Denver L. Pemberton, Fairmount; Elmer E. Smith, Muncie, both of Ind.

[73] Assignee: The Anaconda Company, New York, N.Y.

[21] Appl. No.: 766,781

[22] Filed: Feb. 8, 1977

[51] Int. Cl.² .............................................. B29F 3/04
[52] U.S. Cl. ............................. 425/463; 156/244.12; 425/113; 425/133.1; 425/192 R; 425/467
[58] Field of Search ............... 425/133.1, 113, 114, 425/192 R, 190, 191, 462, 463, 464, 380, 376 R, 381, 466, 467; 156/244, 500; 264/260, 272, 275, 279, 171, 174, 209

[56] References Cited

U.S. PATENT DOCUMENTS 3,222,721  12/1965  Reynolds, Jr. ...................... 425/113

FOREIGN PATENT DOCUMENTS 1,191,097  4/1965  Germany .............................. 42.5/113
522,838  4/1955  Italy ..................................... 156/244

Primary Examiner—Francis S. Husar
Assistant Examiner—Mark Rosenbaum
Attorney, Agent, or Firm—Pennie & Edmonds

[57] ABSTRACT

A fixed center extruder die assembly is disclosed which serves to apply concentric layers of coating materials on an advancing core wire. The assembly which includes three concentrically arranged and interconnected components comprises an outer die block having a centered first passage with a first axis therethrough; a guiding die with a cylindrical tubing top concentrically disposed with the first passage and second passage therethrough with an axis coincident to the first; and an inner guide having a cylindrical tubing tip and thread passage therethrough which has an axis substantially coincident to the first axis. An improved hand tool is envisioned.

2 Claims, 5 Drawing Figures

FIXED CENTER TOOLING FOR AN EXTRUDER THAT PROVIDES FOR CONCENTRIC LAYERS OF COATING MATERIAL

FIELD OF THE INVENTION

In general, this particular invention is directed towards an extruder die assembly for extruding layers of materials onto advancing core wire. Specifically, it relates to a novel and improved extrusion die assembly for consistently applying thin concentric layers of coating material, wherein such assembly eliminates the necessity for manually setting the centers before each run of the core wire, as well as virtually eliminates wandering of the centers. Moreover, an improved hand tool is envisioned for facilitating use of such extrusion apparatus.

DESCRIPTION OF THE PRIOR ART

It is rather conventional practice in the art of coating wires to employ extrusion apparatus. Essentially, such apparatus serves to extrude a plurality of materials over an advancing core wire. One known approach is to pass the core wire through two tandemly arranged extrusion dies having different diameters. A significant disadvantage usually associated with this heretofore known approach is the fact that in the ordinary and normal usage thereof the centers of extrusions often wander. Wandering results in the coating material not being uniformly applied throughout a given operation. Consequently, the concentricity of the applied coatings is extremely difficult to reliably maintain. This particular drawback is even more considerable whenever very thin layers are formed. For example, even misalignments of .001 are considerable if the coating thickness itself is .003 of an inch. Consequently, the aforenoted techniques result in coated cables which are not formed in the manner intended. Therefore, such cables are less likely to satisfactorily function in the desired fashion, for instance, non-uniform coatings, would have a tendency to lead to a more rapid deterioration of the coating integrity. There are similar problems associated with other known techniques. Another generally unsatisfactory approach employs pressure set-up type extruders. Similar drawbacks are associated with these known types of pressure set-up extruders in that the coating material deposited will be less likely to form concentric layers and as firm a contact of material to wire as might otherwise be desirable.

Beyond the above difficulties, significant delays and wastage of time and material are often experienced since such of the noted extruder dies must be manually set before each extrusion run, as well as adjusted for accommodating changes in wire sizes. For instance, to coat a wire of a different size the extruder die block assembly must be cooled and thereafter completely disassembled. This action entails, of course, a timely and costly shut down in the manufacturing time involved. Additionally, the extruder die block assembly must be adjusted and assembled for a new core wire size. After assembly even more time is involved in warming the extruding apparatus to ensure proper flow of such material during extrusion. Aside from the foregoing enumerated shortcomings, the known systems must be stabilized for a period of time to ensure that the die block assembly has been properly and accurately installed. In the usual changeover practice period, several thousand feet of coating materials and core wire are generally scrapped. As a consequence thereof, there often results a significant amount of wasted material.

As can be appreciated from the description of the foregoing prior art relating to various extrusion apparatus for use in applying a plurality of concentric layered compositions onto advancing core there are several significant difficulties. One of the foremost disadvantages is that the centers of the extrusion are subject to wandering and are, therefore, unable to satisfactorily, accurately and concentrically extrude relatively small quantities of coating material onto wire. Furthermore, known extrusion apparatus for coating wire cable are subject to the drawbacks of being relatively expensive to set up since they require extensive labor to disassemble and assemble.

SUMMARY OF THE INVENTION

Accordingly, it is an object of the present invention to overcome the previously described shortcomings typically associated through the use of the various heretofore known extruder die assemblies by provision of a novel and improved extruder die assembly. Such assembly is envisioned to accurately, reliably and successfully control the concentricity of the extruded layers within extremely close tolerances without the necessity of costly assembly and aligning problems while at the same time providing for significant savings by overcoming wastage of the core wires and coating materials. Additionally, the present invention envisions an improved assembly tool for use in connection with such extruder die assembly.

Briefly, in accordance with the present invention there is provided an extruder die assembly for extruding a plurality of concentric layers of composition materials over an advancing core wire. Such extruder die assembly comprises an outer die block means having a first passage therethrough with a first longitudinal axis including a first internal engaging portion. The outer die block includes a generally annular guiding shoulder means formed with an inwardly directed first abutment surface, an intermediate passage portion being concentric to the first axis and terminating in a first plane transverse to the first axis and a generally smooth decreasingly tapered surface extending from the radial surface to said intermediate passage. The assembly further contemplates guiding die means formed with a second passage having its axis substantially coincident with said first axis, first flange means securely cooperating the first internal engaging portion and having an aligning portion cooperating with the first abutment, a multiplicity of spaced ports formed in the flange for permitting flow of a first coating material therethrough, and a cylindrical tubing tip concentrically disposed within the intermediate passage for forming a first annular and concentric material passageway and terminating in the first plane. Guiding die means also includes a generally thin walled conical section interconnecting the tip and the first flange, a second internal engaging section formed internally of the first flange, and a second generally annular guiding shoulder formed with an inwardly directed abutment surface. The die assembly, moreover, comprises inner guiding means defining a third passageway extending therethrough with its axis substantially coincident to the first axis and including a third flange having an external surface securely engaging the second internal engaging section with a multiplicity of spaced ports for permitting flow of a second material, a second aligning portion cooperating with the second abutment shoulder and a cylindrical second tubing tip concentrically disposed within the first tip for forming a second annular and concentric material passageway and terminating in the first plane.

A portable hand tool is contemplated for purposes of facilitating assembly and disassembly of the die block assembly. Such tool is embodied by an elongated handle portion having at one end thereof a plurality of pins projecting from at least one side thereof. The pins are adapted to fit within corresponding openings formed in the guiding die means as well as inner guiding means for fastening and unfastening the same.

BRIEF DESCRIPTION OF THE DRAWINGS

The above, as well as other objects, features and advantages of the present invention will become readily apparent upon a reading of a detailed description of the embodiment of the present invention wherein like reference numerals indicate like structure throughout the several views.

DETAILED DESCRIPTION

Figure 1:
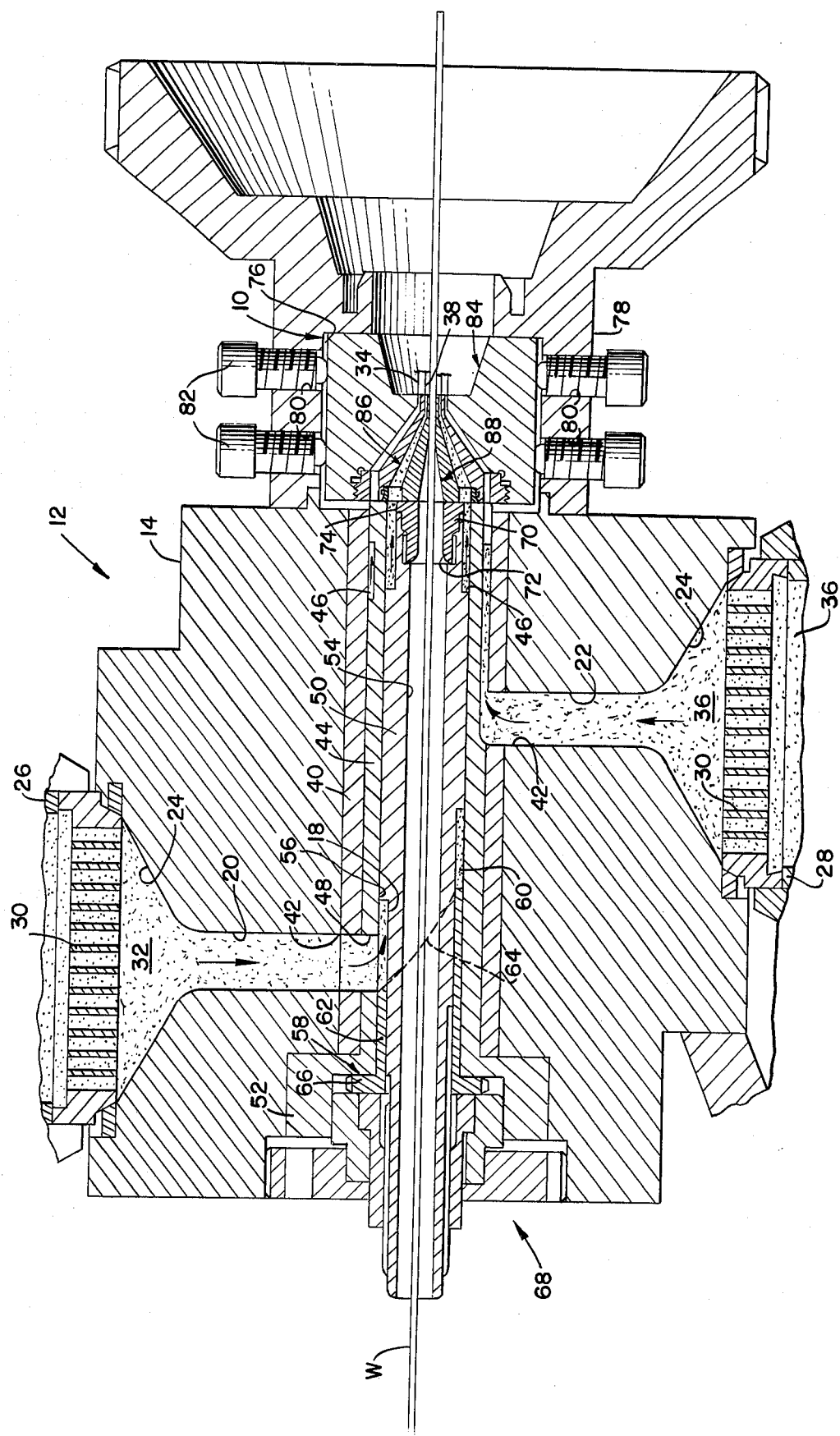
FIG. 1 is a cross-sectional view of a conventional type of core wire extrusion device employing the novel and improved extruder die assembly of the present invention.

Referring to FIG. 1, there is illustrated a preferred embodiment of an extruder die block assembly made in accordance with the present invention and generally designated by reference numeral 10. The die block assembly 10 is principally constructed for purposes of extruding a plurality of concentric layers of coating material over an advancing core wire W. Such assembly 10 is shown being removably attached to a conventional type of extruder apparatus 12 typically employed in the field of coating wire cables. It will be understood that the extruder apparatus 12 is standard and does not form an aspect of the present invention. Consequently, only that structure necessary for an understanding of the operation of the present invention will be subsequently described.

With continued reference to FIG. 1 there is depicted extruder apparatus 12. As shown, there is a standard kind of extruder head 14 having therethrough an elongated central opening 18 and a pair of material inlet feed passages 20 and 22, respectively. Each passage 20 and 22 has an enlarged mouth portion 24 leading into communication with the central opening 18. Conventionally connected to the inlet passages 20 and 22 are containers 26 and 28, respectively, having perforated feed plates 30 suitably connected to the mouth portions 24 which permit passage of material therethrough. The topmost container 26 may house any kind of material 32 desired to be applied to the wire W, such as insulation material. As will be later explained, the material provides for the first or insulation layer 34 on advancing core wire W.

The lowermost container 28 may house a material 36 which forms an outer jacket or second layer 38 on the coated core wire W. As depicted by arrows A, both materials 32 and 36 flow inwardly and towards the central opening 18. At this particular point it will be understood, of course, that such materials are forcibly advanced inwardly in conventional fashion.

Disposed within central opening 18 is a typical open-ended elongated hollow sleeve member 40 having at least a pair of orifices 42 in the side wall thereof. The orifices 42 are arranged such that they are aligned in fluid flow communication with the feed passages 20 and 22 to enable the material to eventually flow to die block assembly 10. Coaxially disposed within and axially extending beyond hollow sleeve 40 is a contoured outer cylindrical core tube member 44. Outer core tube 44 has formed on the outer peripheral surface thereof a spiral type groove 46 to permit and guide the flowing material 36 from passage 22 towards die block assembly 10. Outer core tube 44 has its forward end tightly abutting die block assembly 10. In this particular manner it will serve to prevent leakage of the flowable materials 32 and 36. An aperture 48 formed through core tube 44 is adapted to be placed in registry with one of the orifices 42. Accordingly, the flowable material 32 can flow towards inner core tube 50. The opposite end of outer core tube 44 is formed with an enlarged rearwardly projecting flange 52 which is received within an appropriately formed cut-out in extruder body head 14.

Inner core tube 50 is also of a known type and is adapted to be concentrically disposed within outer core tube 44. Inner core tube 50 is formed with an internal passageway 54 which permits the advancement of the advancing core wire W. A radially extending intermediate portion 56 frictionally contacts the inner passage walls of outer core tube 44 and is arranged between aperture 48 and die block assembly 10. The intermediate portion 56 is formed with a helical type passage (not shown) therethrough for permitting advancement of the flowing material 32. As noted, such intermediate portion 56 terminates short of the die block assembly 10 and permits a continuous annular stream of material 32 to contact the latter. An end plug 58 is adapted to be snugly fit between the annular space 60 existing between the outer and inner core tubes 44 and 50, respectively, for purposes of preventing such material 32 from flowing rearwardly as it enters the annular space from aperture 48. Towards this particular end plug member 58 is configured to have an annular wedge portion 62 with a curved forward surface 64. In addition, the end plug member 58 is formed with a radial flange 66 which is adapted to snugly contact flange 52. It will be appreciated that since extruder apparatus 10 is conventional both the outer and inner core tubes 44 and 50, respectively, as well as outer sleeve 40 are retained in a snug fashion in central passage 18 by the standard type nut retaining assembly indicated generally by reference numeral 68. Also, inner core tube 50 has a forward end of reduced size which is configured to abuttingly engage and cooperate with false die center 70.

False guider member 70 has a central passageway 72 formed therethrough which is generally coaxial with the inner passageway 54 of inner core tube 50. Likewise, false member 70 allows passage of the advancing core wire W. The guider member 70 has an enlarged end 74 which tightly abuttingly engages against one end of the die block assembly 10. By this particular arrangement, a good seal is effected which will protect against inadvertent seepage of the material 32. Hence, the integrity of the extruder system is enhanced.

The die block assembly 10 is connected to the extruder head 14 in a simple and convenient fashion. As illustrated, it is received within a cavity 76 formed by a hollow cup-shaped housing member 78 which has a plurality of threaded apertures 80 therein. Apertures 80 threadedly receive securing cap screws 82 for retaining and properly locating the die block assembly 10 within the cavity. Moreover, the cup-shaped member 78 enables the coated core wire C to continue its advancement for the further standard industrial operations generally performed on such types of coated wires.

Figure 2:
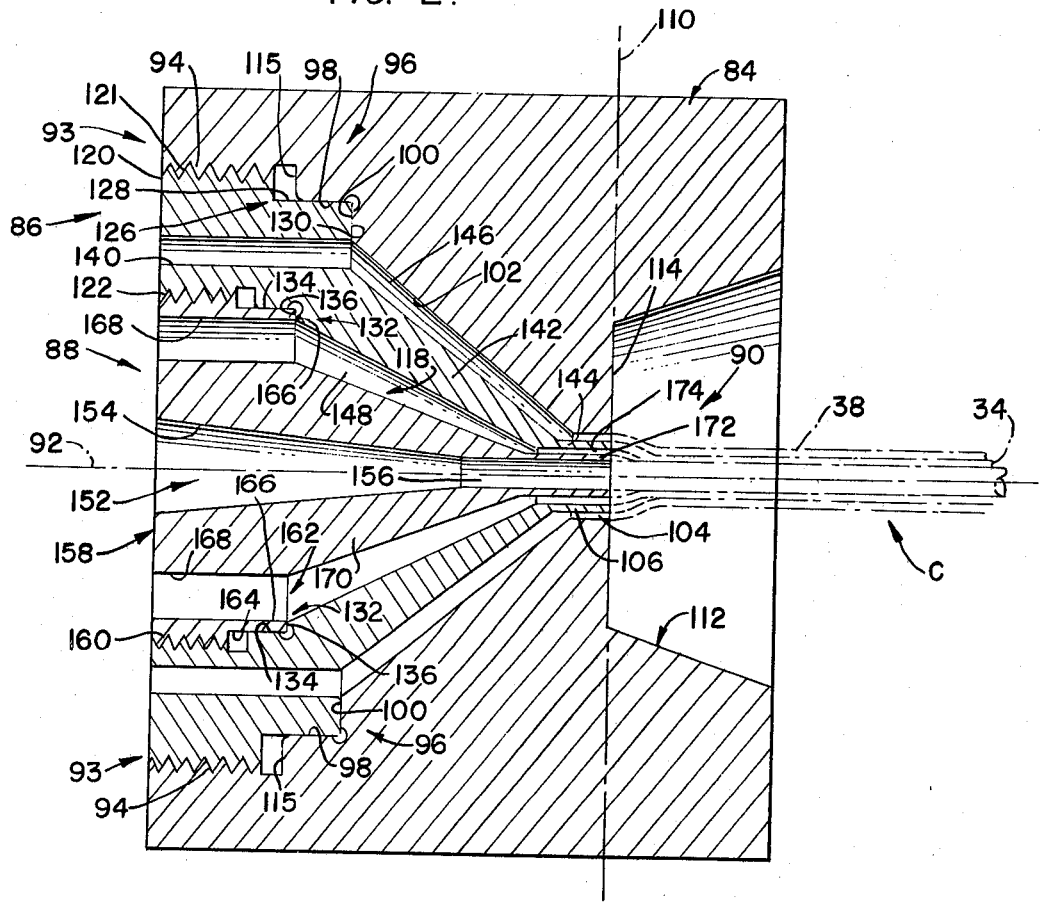
FIG. 2 is an enlarged cross-sectional view of the extruder die assembly as depicted in FIG. 1.

More specifically referring to FIG. 2 taken in conjunction with FIG. 1 there is perhaps best illustrated the novel and improved extruder die block assembly 10. It is seen to essentially include a first or outer die block housing means 84, second or guiding die means 86, and third or inner guiding means 88. In the assembled condition, the foregoing components are arranged to form a compact and easily assembled structure which is capable of being quickly installed in an accurate manner to facilitate an improved coating accuracy for the bare core wire W.

With initial reference to outer block housing means 84 it is formed of an appropriately durable material and of a size and configuration to suitably fit within the cavity 76. In the embodiment being illustrated, it may have a polygonal sided outer surface which cooperates with the cap screws 82 that serve to retain the same therein. A first passageway means 90 is formed throughout the block 84 and has a first longitudinal axis 92. Additionally, the passageway 90 is formed at its entrance with an enlarged internally engaging portion means 93 having a first predetermined diameter. The instant embodiment discloses that the internally engaging portion means 93 is defined by internal type screw threads 94. In addition, guiding shoulder means 96 is formed radially inwardly of the threaded segment 94 and is comprised of a smooth generally concentric annular shoulder 98. Also, first guiding shoulder means 96 is formed with a first abutment surface 100. The abutment surface 100 is also a smooth continuous surface which may be generally transverse to the longitudinal axis 92. It will be quite apparent that the abutment shoulder 100 will act to prevent uncontrolled forward lateral displacement of the guiding die means 86. Further, the guiding shoulder means 96 will, of course, act to guide and center the guiding die means 86 within the die block 84.

Die block 84 includes a smooth conical surface 102 which is suitably formed to extend towards the axis 92 and terminates at the entrance to an intermediate opening or passage 104. The opening 104 is much smaller than the first predetermined diameter and has its axis and inner walls generally coincident with the first axis 92. It will be understood that such opening structurally cooperates with the guiding die means 86 in a manner to be subsequently described, to form a first annular discharge passage 106. Of course, annular discharge passage 106 is to be concentric with the advancing core wire W so that the second layer 38 is accurately and concentrically discharged onto advancing core wire W. The exit end of the passage 106 terminates in a first plane 110 depicted by dot and dash lines in a direction substantially transverse to axis 92. The particular significance of this arrangement will be subsequently explained in greater detail. Accordingly, a cut-out 112 adjacent the annular discharge passage 106 has its inner wall 114 formed to be perpendicular to axis 92.

Although this embodiment has described that the first guiding shoulder means 96 included guiding surface 98 generally radially inwardly disposed with respect to the internal threaded section 94 such guiding surface 98 need not be formed in such a manner. This embodiment of the present invention also contemplates having shoulder 115 adjacent threaded portion 94 serving as the abutment shoulder for preventing undesired forward movement of guiding die means 86.

Figure 3:
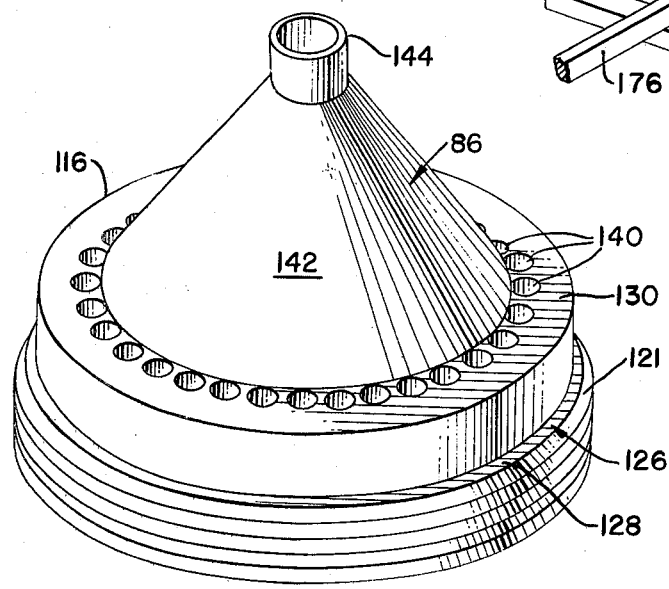
FIG. 3 is an enlarged perspective view of the novel and improved guider die component of the die block assembly embodying the principles of this invention.

In regard to the guiding die means 86 reference is made to FIG. 1 taken together with FIGS. 2 and 3. Preferably, the guiding die means 86 is fabricated as a hollow unitary member 116 being made of a durable material which is generally utilized in the type of industrial environment envisioned for this invention. The guiding die means 86 is adapted to be retained within and separably connected to the outer die block 84 as well as houses inner guiding means 88.

It will be clearly shown in FIG. 2 that guiding die means 86 is formed with second passage means 118 which may have its axis substantially coincident with axis 92 for reasons to be afterwards made apparent. Also included are flange means 120 which is formed to have both external and internal threaded segments 121 and 122, respectively. The external threaded segment 121 is arranged to threadedly cooperate with the internally threaded section 94 to form a releasable connection. Moreover, the flange means 120 is formed with a first aligning portion means 126. The aligning portion 126 is comprised of a generally smooth peripheral and concentric surface 128 and a generally flat and transverse stopping surface 130. As shown, the concentric aligning surface 128 is adapted to engage the guiding surface 98, whereas the flat stopping surface 130 abuttingly engage the abutment surface 100. The foregoing arrangement serves to enable not only a quick and easy assembly of the guiding die means 86 with respect to the outer block 84 but also correctly and accurately guides the former to the desired assembled position. As with the outer die block 84, the guiding die means 86 is similarly formed with an internally formed guiding shoulder means designated by reference character 132 that frictionally cooperates with inner guiding means 88.

The guiding shoulder means 132 similarly includes a second guiding surface 134 which is disposed to be generally radially inwardly with respect to the internal threaded portion 122. The second guiding surface 134 is formed from a smooth continuous surface which is generally concentric to axis 92. An abutment shoulder surface 136 is likewise generally smooth and annular as well as generally transverse to the first axis 92. As is believed evident, the second guiding shoulder means 132 frictionally cooperates with inner guiding means 88 in a manner to be described to properly and accurately center the former in the desired assembled position.

As observed, flange means 120 is fabricated with a multiplicity of fluid openings 140 which may be equidistantly spaced thereabout. Now referring back to FIG. 1 it will be observed that such openings 140 permit the unimpeded travel of material 32 from the orifice 42 and groove 46 to the core wire W through first outer annular passage 106.

Referring, in particular, to FIGS. 2 and 3 it will be noted that guiding die means 86 is provided with a relatively thin-walled conical section 142 having its forward end terminate at and integrally connected to a cylindrical snorkel or tubing tip member 144. In the assembled condition of the outer surface of the conical section 142 of guiding die means 86 forms inclined outer passage 146 for allowing the material 32 to flow towards the first axis 92 and first annular passageway 106. On the other hand, the internal surface of conical wall 142 forms in conjunction with the inner guiding means 88 an inner inclined passageway 148. The snorkel or tubular tip member 144 is concentric to first axis 92 and opening 104 to correspondingly form the noted first annular passage 106. The free end of tubular member 144 also terminates in the plane 110. This particular relationship whenever assembled results in significant advantage which will be discussed in the succeeding description.

Figure 4:
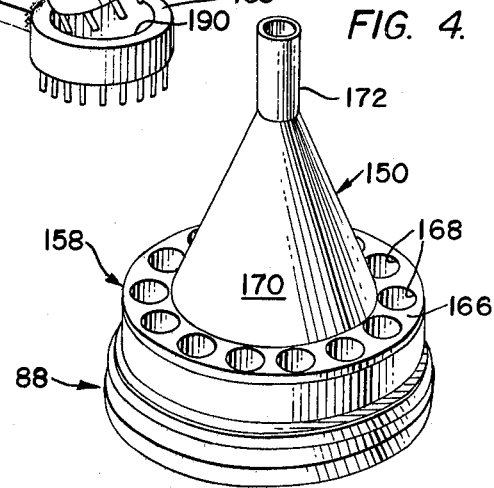
FIG. 4 is an enlarged perspective view of the guider member which forms an integral aspect of the present die block assembly.

Specifically referring to the inner guiding means 88 reference is now made to FIG. 4 together with FIGS. 1 and 2. In general the inner guiding means 88 is formed from a hollow unitary member 150 made of a suitable material. In particular, the unitary member 150 is formed with a third passage 152 therethrough with its axis substantially coincident with the first axis 92. Third passage means 152 is arranged to guide the core wire W as it travels through guider die block assembly 10. Towards this end there is provided a tapered surface 154 and a more narrow concentric passage 156 which even more closely guides the advancing bare wire W to assist in the formation of a coated cable C.

Inner guiding die 88 has a flange means 158 with an external threaded section 160 on a portion of the outer peripheral section thereof. The flange 158 also includes a second aligning means 162 having a generally smooth and concentric surface 164 and generally transverse abutment 166. Surface 164 slidably cooperates with concentric surface shoulder 134 and abutment 166 is adapted to abut against surface 136. Accordingly, by virtue of the foregoing, inner guiding means 88 may be properly and accurately centered within the guiding die means 86. A multiplicity of generally equidistantly spaced openings 168 are formed in flange means 158 and permits the second material 32 to flow along inner passage 148. A thin-walled conical section 170 having smooth surfaces forms in connection with guiding die means 86 the inner passageway 148. The conical section 170 terminates with a second cylindrical snorkel or tubing tip 172 having its free end terminate in plane 110. The second snorkel or tubing tip 172 defines a second annular passageway 174 and assists in the formation of the inner annular and concentric layer 34. The dimension of the first and second annular passages 106 and 174, respectively, will, of course, determine to an extent the thickness of the respective layers 34 and 38. It is understood that to vary the thickness of the respective layers it is known to vary the feed rates of the coating materials and core wire W. By having the opening 104 and snorkel or tubing tips terminate in the same plane it has been determined that each material is better able to make a concentric contact with the respective material or wire it descends upon. The foregoing results in a cable having the coating layers with significantly improved accuracy and also better adhered to each other and the core wire.

Owing to the foregoing constructional arrangement die block assembly 10 provides for a compact, easily assemblable and highly reliable structure which consistently and accurately provides an advancing core wire with a multiplicity of concentric layers free of deviations in thickness. Should the wire size change there need not be any alteration. Additionally, should larger size wire be used then the inner guiding means 88 can be easily removed without affecting the concentricity of annular passage 106.

While the present embodiment has shown threaded forms of connection between the components it is understood, of course, that other forms of connection, such as press fits, may be provided without departing from the spirit and scope of this invention.

Figure 5:
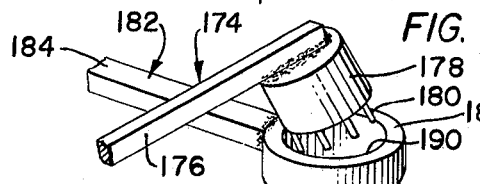
FIG. 5 is a perspective view of a pair of tools embodying the principles of the present invention and which are particularly adapted for use in conjunction with the die block assembly.

With the application of threaded releasable connections between the noted components the present invention also envisions novel and improved hand tools such as of the type depicted in FIG. 5. It will be seen that one portable hand tool 174 includes an elongated handle 176 section terminating in a solid cylindrical head portion 178. Projecting from head 178 in a direction generally parallel to the head portion are a plurality of generally cylindrical pin type members 180 arranged in a generally annulus fashion to correspond to the openings 168. Also, the pins 180 are sized to suitably fit within the corresponding openings 168 formed in the inner guiding means 88 to enable the tool to remove the same from guiding means 86 in a quick fashion. It will be realized, of course, that tool 174 may be contemplated for different sized inner guiding means as well as if desired the guiding die means of this invention. The corresponding significant difference in each tool would be the spacing and size of the pins 180. As is evident, only slight manual operation of the tool is necessary to ensure the quick assembly and disassembly of the die block assembly means.

The instant invention also includes a hand tool 182 similar to the previously described embodiment. Hand tool 182 includes handle 184 and head portion 186. Head portion 186, however, is not solid but may be annular in shape having pins 188 projecting outwardly therefrom in a direction generally transverse to the longitudinal axis of the handle. In this embodiment the annular portion 186 forms an opening 190 which permits passage of the head 178 of tool 174. Other sizes for openings 190 are contemplated. Similarly hand tool 182 is adapted to facilitate rapid assembly and disassembly of the guiding means 86 of die block assembly 10. Its size, of course, can vary to meet the specific size requirements of die block assembly. As depicted in FIG. 5, the two tools can be used together whereby the hand tool 174 is inserted into opening 190 of hand tool 182.

While the invention has been described in connection with the preferred embodiments, it is not intended to limit the invention to the particular forms set forth abut, on the contrary, it is intended to cover such alternatives, modifications, and equivalents as may be included within the spirit and scope of the invention as defined by the appended claims.

What is claimed is:

1. A fixed center extruder die assembly for applying concentric layers of coating material over an advancing core wire embodies an outer die block means with a first passage therethrough having a first longitudinal axis and including a first internal engaging portion; said die block means also including a generally annular guiding shoulder formed with an inwardly directed first abutment surface, an intermediate passage portion being concentric to the first axis and terminating in a first plane transverse to the first axis, and a generally smooth decreasingly tapered surface extending from the abutment surface to the intermediate passage; guiding die means having a second passage therethrough having its axis substantially coincident with the first axis, first flange means securely cooperating with the first internal engaging portion and having an aligning portion cooperating with the first abutment, a multiplicity of spaced ports formed in the flange for permitting flow of a first coating material therethrough, and a cylindrical tubing tip concentrically disposed within the intermediate passage for forming a first annular and concentric material passageway and terminating in the first plane, the guiding die means also including a generally thin walled conical section interconnecting the tip and the first flange, a second internal engaging section formed internally of the first flange, and a second generally annular guiding shoulder formed with an inwardly directed second abutment surface; and inner guiding means defining a third passageway extending therethrough with its axis substantially coincident to the first axis and including a third flange having an external surface securely engaging the second internal engaging section, a mulitiplicity of spaced ports, a second aligning portion cooperating with the second abutment shoulder, a second cylindrical tubing tip concentrically disposed within the first tip and terminating in the first plane for forming a second annular and concentric material passageway.

2. The extruder die as set forth in claim 1 in which said first internal engaging portion of said outer die block means, said internal and external engaging portions of said guiding die means and said external surface portion of said inner guiding means are suitably formed by threaded connections.

* * * * *